UNITED STATES PATENT OFFICE.

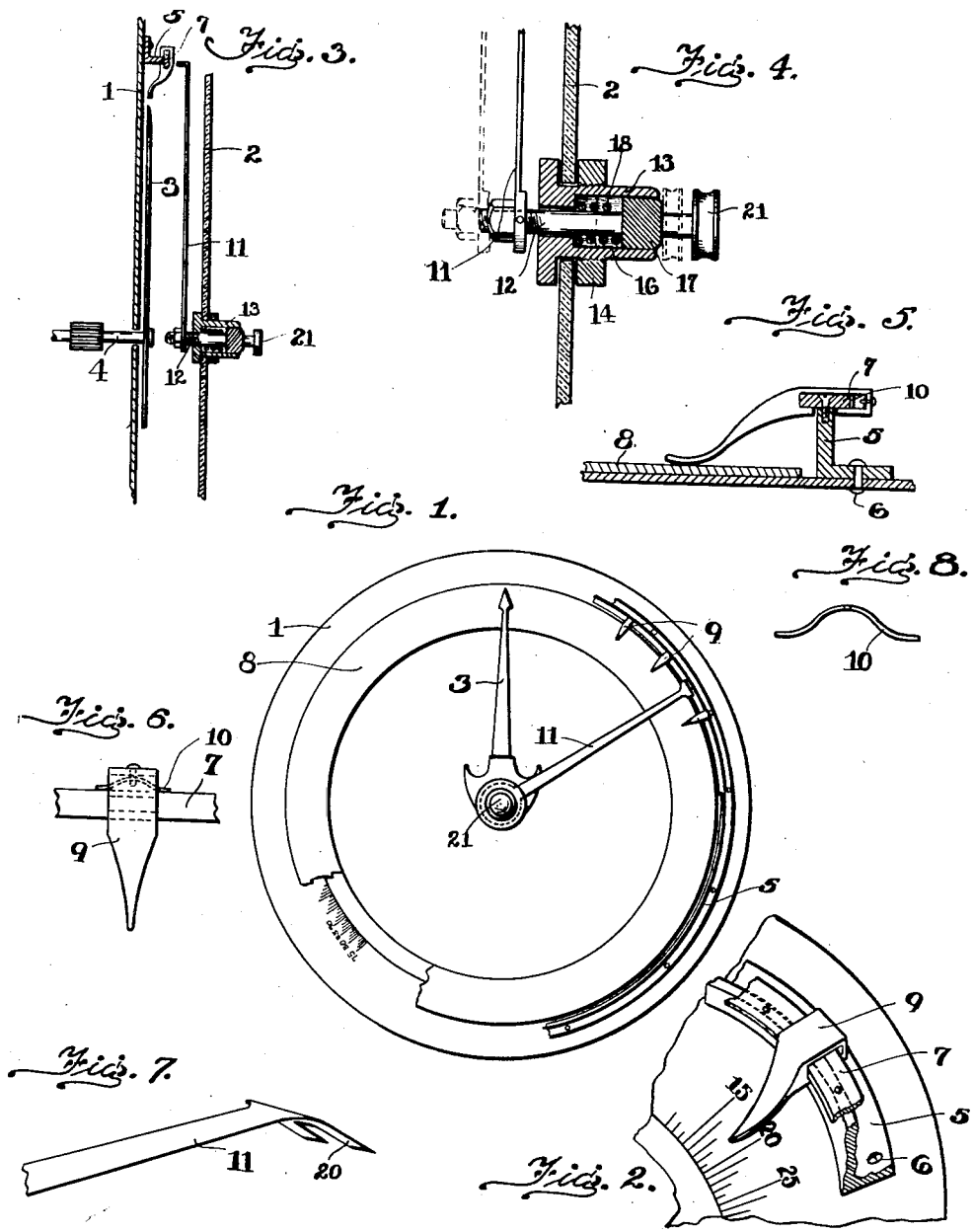

HALVOR O. HEM, OF TOLEDO, OHIO, ASSIGNOR TO TOLEDO SCALE COMPANY, OF TOLEDO, OHIO, A CORPORATION OF NEW JERSEY.

PREDETERMINED-WEIGHT SCALE.

1,397,518.  Specification of Letters Patent.  Patented Nov. 22, 1921.

Application filed April 5, 1920. Serial No. 371,278.

*To all whom it may concern:*

Be it known that I, HALVOR O. HEM, a citizen of the United States, residing at Toledo, in the county of Lucas and State of Ohio, have invented certain new and useful Improvements in Predetermined-Weight Scales, of which the following is a specification.

This invention relates to weighing scales, and particularly to the indicating mechanism thereof, and one of its principal objects is the provision of predetermined weight indicators and mechanism for positioning the same, thereby enhancing the usefulness of the scale for weighing out the ingredients of compounds.

Another object is the provision of a scale having a plurality of predetermined weight pointers so that the ingredients of a compound may be added without the aid of mental calculation, thereby reducing the liability of error and increasing the speed of operation.

Another object is the provision of a device for weighing out the ingredients of compounds which may be operated by persons to whom the mixing formula has not been divulged.

Still another object is the provision of an easily manipulated device for moving the predetermined weight pointers from one position to another.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation showing somewhat diagrammatically a scale dial with my invention applied thereto;

Fig. 2 is an enlarged fragmentary perspective view showing the manner of mounting the predetermined weight pointer;

Fig. 3 is a fragmentary vertical sectional view through the scale dial and the pointer manipulating arm;

Fig. 4 is an enlarged fragmentary sectional view showing the manner of mounting the pointer manipulating arm;

Fig. 5 is an enlarged fragmentary sectional view through the pointer supporting member;

Fig. 6 is an enlarged front elevation of a pointer;

Fig. 7 is a view in perspective of the tip of the pointer manipulating arm; and

Fig. 8 is an elevation of a friction spring for holding the pointer in place.

I have shown my invention in connection with a hand and dial indicating device, but it is to be understood that the invention is also adapted for use with other types of indicators and that I contemplate its use wherever applicable.

In the embodiment illustrated, the dial 1 is visible through the glass front 2 of the casing in which the indicating mechanism is inclosed. The hand 3 which swings over the dial to indicate the weight of a load on the scale is fixed to a shaft 4 suitably connected to the load-offsetting mechanism of the scale. (Not shown.)

The dial 1 over which the indicator hand swings may be graduated as shown in Fig. 2, so that the hand 3 when in weighing position indicates the weight of the load offset in pounds and ounces. When the dial is so marked the scale may be used in ordinary weighing operations without interference from the predetermined weight pointers or the mechanism for moving them. As shown in Figs. 2, 3 and 5, an annulus 5 of right-angle cross-section is secured to the face of the chart near the periphery thereof by means of suitable fastening devices 6, and secured upon the edge of the annulus 5 is a flat ring 7. When it is desired to conceal the graduations on the chart they may be covered by means of an annular plate 8 which is interposed between the dial and the annulus 5. The dial may, of course, be left blank when it is desired to use the scale solely for secret compounding.

Mounted upon the ring 7 is a plurality of predetermined weight pointers 9 each of which is provided with a finger sufficiently large to receive the ring 7 and also a spring 10 which serves to frictionally hold the pointer in place. The tips of the pointers 9 and the indicator hand 3 are in the same vertical plane so that there is no possibility of error in reading the position of the indicator hand on account of parallax due to the operator's position. The movable pointers may be successively numbered and the ingredients in a compound designated by corresponding numbers. Thus, for example, if 280 lbs. of No. 1 ingredient are to be used in a certain compound, the No. 1 pointer is set at 280 lbs. on the chart, and if 320 lbs. of No. 2 ingredient are to be used, the No. 2 pointer is set at 600 lbs., the sum of 280 and 320 lbs., and so on until a pointer is set for each ingredient. All that the operator then has to do is to put in No. 1 ingredient until the indicating hand points to the No. 1 predetermined weight pointer, add No. 2 ingredient until the indicator hand points to No. 2 predetermined weight pointer, and so on. He need not keep in mind or even know the number of pounds of the various ingredients, and need make no mental calculation whatever.

In order that the predetermined weight pointers may be readily moved from position to position on the ring 7, I have provided an arm 11 fixed to a shaft 12 arranged in horizontal alinement with the indicator shaft 4 and mounted in an elongated bushing 13 passing through an opening in the center of the glass 2 and held in place by means of a nut 14. The bore of the bushing 13 is widened at its outer end, as at 16, to receive an enlargement 17 on the shaft 12, and between the enlargement 17 and the shoulder formed by the inner wall of the widened portion 16 of the bushing bore is an expansive spring 18 which presses the enlargement 17 outwardly and thus yieldably holds the arm 11 in inoperative position, as shown in Fig. 3.

The free end of the arm 11 is preferably bent inwardly and provided with a pair of fingers 20 (see Fig. 7) adapted to fit over and engage the sides of the predetermined weight pointers. The outer end of the shaft 12 is provided with a knob 21 by which it may be turned until the arm 11 is directly over one of the pointers 9. The shaft may then be thrust inwardly against the resistance of the spring 18 until the fingers 20 engage the sides of the selected pointer. The shaft 12 may then be turned while it is kept pushed in, thus sliding the pointer along the ring 7 to any desired position. The pressure of the knob 21 may then be released and the arm 11 will be returned to inoperative position. The arm may then be used to position another pointer or turned to a position in which it will not interfere with reading the chart.

When the dial is blank or when the graduations are concealed, the foreman or other person to whom the mixing formula is known may set the pointers by means of master weights. The compounding may then be done by an operator to whom the formula has not been divulged.

It is believed to be apparent from the foregoing that I have provided a predetermined weight scale which is quickly adjustable to any compounding formula and yet is available for use in ordinary weighing.

While it will be apparent that the illustrated embodiment of my invention herein disclosed is well calculated to adequately fulfil the objects primarily stated, it is to be understood that the invention is susceptible to variation, modification and change within the spirit and scope of the subjoined claims.

Having described my invention, I claim:

1. In a weighing scale, in combination, a casing, a series of pointers movably mounted therein, and a single means operable from without the casing for engaging and moving each of the pointers of said series, substantially as described.

2. In a weighing scale, in combination, a casing having a transparent portion, a series of pointers movably mounted within said casing and visible through said transparent portion, and means operable from without the casing for engaging and moving each of the pointers of said series.

3. In a weighing scale, in combination, a casing having a transparent portion, a series of pointers movably mounted within said casing and visible through said transparent portion, and means mounted in said transparent portion and operable from without the casing for engaging and moving said pointers.

4. In a weighing scale, in combination, a curved support, a series of pointers movably mounted thereon, and an arm selectively engageable with said pointers pivoted at the center of curvature of said support and operable to move said pointers along said support.

5. In a weighing scale, in combination, a casing having a transparent portion, a curved support, a series of pointers mounted thereon within said casing and visible through said transparent portion, and an operating arm pivoted at the center of curvature of said support and selectively engageable with said pointers to move the same along said support.

6. In a weighing scale, in combination, a casing having a transparent portion, a curved support, a series of pointers mounted thereon within said casing and visible through said transparent portion, an operating shaft projecting through said transparent portion at the center of curvature of said support, and an operating arm fixed to said shaft and selectively engageable with said pointers to move them along said support.

7. In a weighing scale, in combination, a casing having a transparent portion, a curved support, a series of pointers thereon within said casing and visible through said transparent portion, an operating shaft projecting through said transparent portion at the center of curvature of said support, and an operating arm fixed to said shaft, said shaft being axially movable to engage said arm with said pointer.

8. In a weighing scale, in combination, a casing having a transparent portion, a curved support, a series of pointers mounted thereon within said casing and visible through said transparent portion, an operating shaft projecting through said transparent portion at the center of curvature of said support, and an operating arm fixed to said shaft, said shaft being axially movable to engage said arm with said pointer and rotatable for positioning said pointers.

9. In a weighing scale, in combination, a casing having a transparent portion, a curved support, a series of pointers mounted thereon within said casing and visible through said transparent portion, an operating shaft projecting through said transparent portion at the center of curvature of said support, an operating arm fixed to said shaft and selectively engageable with said pointers to move them along said support, and spring means for moving said shaft to disengage said arm from said pointers.

10. In a weighing scale, in combination, a curved support, a series of pointers movably mounted thereon, an arm selectively engageable with said pointers pivoted at the center of curvature of said support and operable to move said pointers along said support, and spring means for frictionally holding said pointers in adjusted position.

HALVOR O. HEM.

Witnesses:
C. E. WILCOX,
C. O. MARSHALL.